United States Patent
Hatano et al.

(10) Patent No.: US 6,237,550 B1
(45) Date of Patent: May 29, 2001

(54) SOLENOID-OPERATED VALVE FOR INTERNAL COMBUSTION ENGINE

(75) Inventors: Harumi Hatano; Chihaya Sugimoto; Yoshinori Onohara; Kouichi Ikoma, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/447,235

(22) Filed: Nov. 23, 1999

(30) Foreign Application Priority Data

Dec. 17, 1998 (JP) .................................... 10-359760

(51) Int. Cl.⁷ ...................................................... F01L 9/04
(52) U.S. Cl. .................................... 123/90.11; 123/90.49; 251/129.1; 251/129.15
(58) Field of Search .............................. 123/90.11, 90.12, 123/90.48, 90.49; 251/129.01, 129.05, 129.1, 129.15, 129.16

(56) References Cited

U.S. PATENT DOCUMENTS

| | | | |
|---|---|---|---|
| 4,878,464 | * 11/1989 | Richeson, Jr. et al. | 123/90.11 |
| 5,636,601 | * 6/1997 | Moriya et al. | 123/90.11 |
| 5,832,883 | * 11/1998 | Bae | 123/90.11 |
| 6,101,992 | * 8/2000 | Pischinger et al. | 123/90.11 |

\* cited by examiner

Primary Examiner—Weilun Lo
(74) Attorney, Agent, or Firm—Arent Fox Kintner Plotkin & Kahn

(57) ABSTRACT

A solenoid-operated valve for use in an internal combustion engine has a valve body movable into and out of abutment of an intake/exhaust port in the internal combustion engine to close and open an intake/exhaust passage in communication therewith, a movable plate connected to the valve body by a transmission valve stem, a first solenoid for magnetically attracting the movable plate to cause the valve body to close the intake/exhaust port, and a second solenoid disposed in confronting relation to the first solenoid with the movable plate interposed therebetween, for magnetically attracting the movable plate to cause the valve body to open the intake/exhaust port. A piston is movable in a cylinder in unison with the transmission valve stem until the valve body closes the intake/exhaust port when the first solenoid magnetically attracts the movable plate to position the valve body closely to the intake/exhaust port. The cylinder gradually discharges a fluid filled therein in response to movement of the piston, for thereby causing dampening or the transmission valve stem to reduce a speed at which the valve body closes the intake/exhaust port.

9 Claims, 2 Drawing Sheets

SOLENOID-OPERATED VALVE FOR INTERNAL COMBUSTION ENGINE

BACKGROUND OF THE INVENTION

1. Field of the Invention

The present invention relates to a solenoid-operated valve for opening and closing an intake or exhaust port of an internal combustion engine.

2. Description of the Related Art

There have heretofore been known solenoid-operated valves having a valve body that is operated by solenoids to open and close an intake or exhaust port of an internal combustion engine. Such a solenoid-operated valve has a movable plate connected to the valve body by a transmission valve stem, and first and second solenoids disposed in confronting relation to each other with the movable plate interposed therebetween. The movable plate is attracted by electromagnetic forces that are alternately generated by the first and second solenoids so as to move between the first and second solenoids. When the movable plate is attracted to the first solenoid, the valve body closes the intake or exhaust valve, and when the movable plate is attracted to the second solenoid, the valve body opens the intake or exhaust valve.

If the electric energy alternately supplied to the first and second solenoids is of a constant level, then the electromagnetic force applied to the movable plate by the first solenoid and the electromagnetic force applied to the movable plate by the second solenoid are small when the movable plate is spaced from the first solenoid or the second solenoid, and becomes progressively greater when the movable plate moves closer to the first solenoid or the second solenoid. Therefore, the speed at which the movable plate is displaced increases as the movable plate moves closer to the first solenoid or the second solenoid. When the movable plate is attracted to the first solenoid, since the valve body is displaced at an increased speed, the valve body abruptly closes the intake or exhaust port, tending to produce noise and vibrations when the valve body hits the intake or exhaust port. The movable plate also tends to produce noise and vibrations as it is abruptly attracted to the first solenoid and the second solenoid.

To avoid the above drawbacks, it is customary to supply an increased amount of the electric energy, e.g., a current, to the first and second solenoids when the movable plate is far from the first solenoid or the second solenoid, and supply a reduced amount of the electric energy, e.g., a current, to the first and second solenoids when the movable plate is positioned closely to the first solenoid or the second solenoid. In this manner, when the movable plate is far from the first solenoid or the second solenoid, the speed at which the movable plate is displaced is high, and after the movable plate is positioned closely to the first solenoid or the second solenoid, the speed at which the movable plate is displaced is lowered.

However, controlling only the electric energy supplied to the first and second solenoids is not enough to quickly reduce the speed at which the movable plate is displaced after the movable plate is positioned closely to the first solenoid or the second solenoid.

According to one known solution, a slider is provided to slidingly contact the movable plate or the transmission valve stem when the movable plate is positioned closely to the first solenoid or the second solenoid, thereby exerting an increased sliding resistance to the movable plate or the transmission valve stem. In this fashion, when the movable plate is attracted to the first solenoid or the second solenoid, the movable plate is quickly decelerated to reduce the noise or vibrations produced when the movable plate is attracted to the solenoid. Since the slider is disposed for sliding contact with the movable plate or the transmission valve stem when the movable plate is positioned closely to the first solenoid or the second solenoid, when the movable plate is positioned out of sliding contact with the slider, i.e., positioned away from the solenoid, the movement of the movable plate under the magnetic attractive forces from the solenoid is not impaired by the slider. Consequently, the movable plate can move at sufficient speeds between the first and second solenoids, and can quickly be decelerated after it is positioned closely to the solenoid until attracted thereto.

However, increasing the sliding resistance to the movable plate or the transmission valve stem thereby to reduce the speed at which the movable plate is displaced results in undue wear on the movable plate or the transmission valve stem. After use of the solenoid-operated valve over a long period of time, consequently, the movable plate may not be sufficiently be decelerated.

SUMMARY OF THE INVENTION

It is therefore an object of the present invention to provide a solenoid-operated valve for use in an internal combustion engine, which has a movable plate and a transmission valve stem that are highly durable without being subject to undue wear, and that are capable of reliably reducing noise and vibrations.

To achieve the above object, there is provided in accordance with the present invention a solenoid-operated valve for use in an internal combustion engine, comprising a valve body movable into and out of abutment of an intake/exhaust port in the internal combustion engine to close and open an intake/exhaust passage in communication therewith, a movable plate connected to the valve body by a transmission valve stem, a first solenoid for magnetically attracting the movable plate to cause the valve body to close the intake/exhaust port, a second solenoid disposed in confronting relation to the first solenoid with the movable plate interposed therebetween, for magnetically attracting the movable plate to cause the valve body to open the intake/exhaust port, a piston movable in unison with the transmission valve stem until the valve body closes the intake/exhaust port when the first solenoid magnetically attracts the movable plate to position the valve body closely to the intake/exhaust port, and a cylinder for gradually discharging a fluid filled therein in response to movement of the piston, for thereby causing the transmission valve stem to reduce a speed at which the valve body closes the intake/exhaust port.

With the above arrangement, the first solenoid magnetically attracts the movable plate to cause the valve body to close the intake/exhaust port through the transmission valve stem connected to the movable plate. At this time, the piston moves in the cylinder in unison with the transmission valve stem after the valve body is positioned closely to the intake/exhaust port until it closes the intake/exhaust port. Since the cylinder gradually discharges the fluid filled therein upon movement of the piston, the resistance to the discharging of the fluid from the cylinder suppresses quick movement of the piston. With quick movement of the piston being suppressed, the speed at which the transmission valve stem moves is reduced, sufficiently decelerating the valve body when it closes the intake/exhaust port. Accordingly, the valve body is prevented from abruptly closing the intake/exhaust port, for thereby reliably reducing noise and vibrations produced when the valve body closes the intake/exhaust port.

When the cylinder suppresses quick movement of the piston, the transmission valve stem reduces the speed at which the movable plate is displaced. Therefore, noise and vibrations produced when the movable plate is attracted to the first solenoid are reliably lowered.

Furthermore, inasmuch as the fluid is gradually discharged from the cylinder upon movement of the piston, lowering the speed at which the valve body is displaced and the speed at which the movable plate is displaced, the movable plate and the transmission valve stem are subject to much less wear and are much more durable than the conventional solenoid-operated valves in which the speeds of the movable plate and the transmission valve stem are reduced by increasing the resistance to their sliding movement.

The piston moves in unison with the transmission valve stem when the movable plate is positioned closely to the first solenoid. The movable plate is not decelerated by the piston when the movable plate is otherwise positioned. Consequently, the movable plate maintains a sufficient speed when it moves between the first and second solenoids, and can be decelerated only after the movable plate is positioned closely to the first solenoid until it is attracted to the first solenoid.

Moreover, the transmission valve stem extends from the valve body slidably through the second solenoid and the first solenoid and has an increased-diameter portion disposed between the first solenoid and the movable plate, the piston being connected to a movable member which is movable along the transmission valve stem, the movable member being capable of abutting against the increased-diameter portion to cause the piston to move in unison with the transmission valve stem when the valve body is positioned closely to the intake/exhaust port. When the valve body is positioned closely to the intake/exhaust port, therefore, the piston is reliably caused to move in unison with the transmission valve stem.

Furthermore, the cylinder has a fluid supply port for supplying the fluid into the cylinder therethrough and a fluid discharge port for discharging the fluid from the cylinder therethrough, the fluid discharge port being positioned so as to be gradually closable by the piston when the piston moves to discharge the fluid through the fluid discharge port.

The cylinder is filled with the fluid via the fluid supply port. The cylinder develops an internal pressure imparted when it is supplied with the fluid. Since the fluid discharge port is gradually closed by the piston which moves, the resistance to the discharging of the fluid from the fluid discharge port gradually increases as the piston moves. Since the fluid discharge port is closed by the piston, the speed at which the valve body is displaced and the speed at which the movable plate is displaced can reliably be reduced with a highly simple arrangement. Because the piston reaches its stroke end while its speed is gradually lowered from the start of movement, when the valve body closes the intake/exhaust port, the movable plate can smoothly be decelerated rapidly when attracted by the first solenoid.

In addition, the cylinder is supplied with, as the fluid, a lubricant for the internal combustion engine via the fluid supply port. Generally, the internal combustion engine has an oil passage for circulating the lubricant therethrough with an oil pump or the like. For supplying the lubricant from the fluid supply port, the fluid supply port may simply be connected to the oil passage. Consequently, the cylinder may be supplied with the fluid with a simple arrangement.

Furthermore, the solenoid-operated valve may comprise solenoid control means for reducing electric energy supplied to the first solenoid in response to movement of the piston.

If the electric energy supplied to the first solenoid is constant in level, then the electromagnetic force applied to the movable plate by the first solenoid is smaller when the movable plate is far from the first solenoid, and increases as the movable plate becomes closer to the first solenoid. Therefore, the speed at which the movable plate is displaced increases as the movable plate becomes closer to the first solenoid, as described above.

According to the present invention, the cylinder is arranged to suppress movement of the piston so as to lower the speed at which the movable plate is displaced as the movable plate becomes closer to the first solenoid. Therefore, when the cylinder suppresses movement of the piston, the electromagnetic force generated by the first solenoid acts to impair the suppression of movement of the piston, and hence is wasted. The solenoid control means according to the present invention reduces the electric energy supplied to the first solenoid depending on the movement of the piston. The deceleration of the piston is thus prevented from being impaired by undue electromagnetic forces, allowing the valve body and the movable plate to be decelerated sufficiently. The consumption of electric energy by the first solenoid can be made smaller than if the electric energy supplied to the first solenoid were constant in level.

Moreover, the solenoid-operated valve further comprises another piston movable in unison with the transmission valve stem until the movable body is attracted to the second solenoid when the second solenoid magnetically attracts the movable plate to position the movable body closely to the second solenoid, and another cylinder for gradually discharging a fluid filled therein in response to movement of the other piston, for thereby causing the transmission valve stem to reduce a speed at which the movable plate is displaced.

The other piston and the other cylinder, added to the first-mentioned piston and cylinder, are effective to sufficiently reduce the speed at which the movable plate is displaced when it is attracted to the second solenoid. Accordingly, the movable plate is prevented from being abruptly attracted to the second solenoid, for thereby further reducing noise and vibrations.

The transmission valve stem extends slidably through the second solenoid and has an increased-diameter portion disposed between the second solenoid and the movable plate, the other piston being connected to a movable member which is movable along the transmission valve stem, the movable member being capable of abutting against the increased-diameter portion to cause the other piston to move in unison with the transmission valve stem when the movable plate is positioned closely to the second solenoid. When the movable plate is positioned closely to the second solenoid, the other piston can reliably be moved in unison with the transmission valve stem.

The other cylinder has a fluid supply port for supplying the fluid into the other cylinder therethrough and a fluid discharge port for discharging the fluid from the other cylinder therethrough, the fluid discharge port being positioned so as to be gradually closable by the other piston when the other piston moves to discharge the fluid through the fluid discharge port. Since the fluid discharge port is closed by the other piston, the speed at which the valve body is displaced and the speed at which the movable plate is displaced can reliably be reduced with a highly simple arrangement when the valve body opens the intake/exhaust port. Because the other piston reaches its stroke end while its speed is gradually lowered from the start of movement, when the valve body closes the intake/exhaust port, the movable plate can smoothly be decelerated rapidly when attracted by the first solenoid.

The other cylinder is supplied with, as the fluid, a lubricant for the internal combustion engine via the fluid supply port. The fluid supply port may simply be connected to an existing oil passage in which the lubricant for the internal combustion engine circulates. The other cylinder can be supplied with the fluid in a simple arrangement.

The solenoid-operated valve further comprises another solenoid control means for reducing electric energy supplied to the second solenoid in response to movement of the other piston. As with the controlling of the first solenoid with the above solenoid control means, the other solenoid control means reduces the electric energy supplied to the second solenoid for thereby decelerating the movable plate when the movable plate is attracted to the second solenoid. The consumption of electric energy by the second solenoid can be made smaller than if the electric energy supplied to the second solenoid were constant in level.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
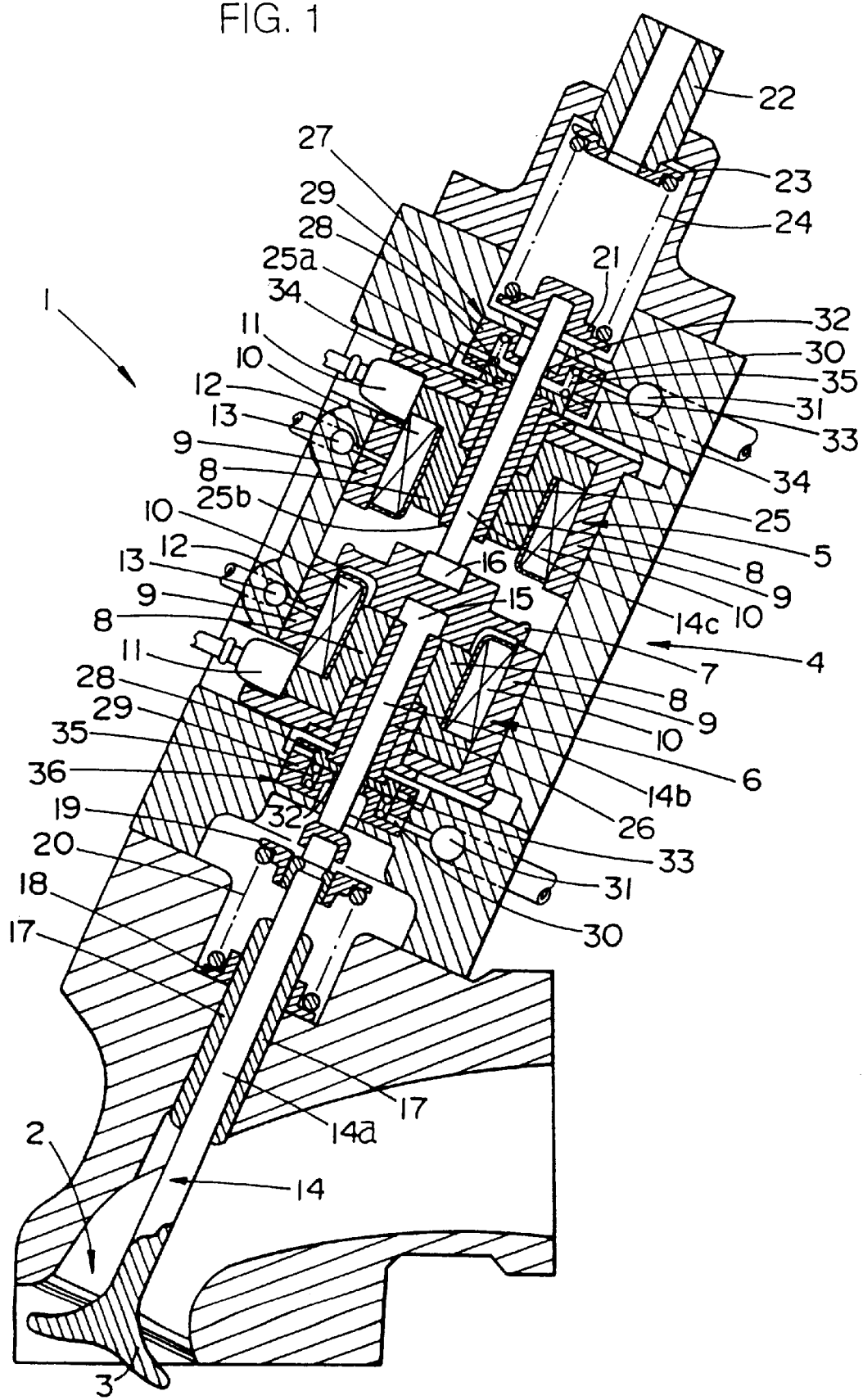
FIG. 1 is a longitudinal cross-sectional view of a solenoid-operated valve according to the present invention.

As shown in FIG. 1, a solenoid-operated valve 1 according to the present invention comprises a valve body 3 disposed in an intake (or exhaust) passage 2 of an internal combustion engine, for selectively opening and closing the intake passage 2 at its port, and an actuator 4 for actuating the valve body 3 to selectively open and close the intake passage 2. The actuator 4 comprises a first solenoid or electromagnet 5 disposed in an upper position as shown, a second solenoid or electromagnet 6 disposed in a lower position below the first solenoid 5, and a movable plate 7 positioned between the first and second solenoids 5, 6. The movable plate 7 is in the form of a disk made of magnetic metal, and can be moved vertically when magnetically attracted by the first and second solenoids 5, 6.

The first solenoid 5 and the second solenoid 6 are structurally identical to each other, and each have an inner yoke 8, an outer yoke 9, and a solenoid coil 10 disposed between the inner and outer yokes 8, 9. The solenoid coils 10 of the first and second solenoids 5, 6 are supplied with electric energy via respective terminals 11 from a solenoid control means (not shown). The solenoid coils 10 are cooled by cooling oil supplied via oil supply passages 12 defined in the outer yokes 9 of the first and second solenoids 5, 6. In this embodiment, the cooling oil comprises the lubricant for the internal combustion engine, and is supplied to the oil supply passages 12 from oil passages 13 that are connected to an oil pump (not shown).

A transmission valve stem 14 extends upwardly from the valve body 3. In the illustrated embodiment, the transmission valve stem 14 is divided into a plurality of segments. Specifically, the transmission valve stem 14 comprises a first valve stem segment 14a with the valve body 3 integrally joined to its lower end, a second valve stem segment 14b abutting against and extending upwardly from an upper end of the first valve stem segment 14a and having on an upper end thereof an increased-diameter portion 15 to which the movable plate 7 is connected, and a third valve stem segment 14c extending coaxially upwardly from the second valve stem segment 14b and having on a lower end thereof an increased-diameter portion 16 to which the movable plate 7 is connected.

The first valve stem segment 14a is slidably supported by and extends through a valve guide 17 disposed in an upper wall of the intake passage 2, and holds the valve body 3 in a position to selectively open and close the intake passage 2. The first valve stem segment 14a is normally urged upwardly by a first spring 20 acting between a lower spring seat 18 fixed to a peripheral wall of the valve guide 17 and an upper spring seat 19 fixed to the first valve stem segment 14a. Therefore, the first valve stem segment 14a is normally subject to an upward biasing force from the first spring 20.

The third valve stem segment 14c is normally urged downwardly by a second spring 24 acting between a lower spring seat 21 fixed to an upper end of the third valve stem segment 14c and an upper spring seat 23 mounted on a fixture 22 above the third valve stem segment 14c. Therefore, the third valve stem segment 14c is normally subject to a downward biasing force from the second spring 24.

The third valve stem segment 14c extends axially through the first solenoid 5 and is axially slidably supported by a first movable sleeve 25 in the first solenoid 5. Similarly, the second valve stem segment 14b extends axially through the second solenoid 6 and is axially slidably supported by a second movable sleeve 26 in the second solenoid 6.

Figure 2A:
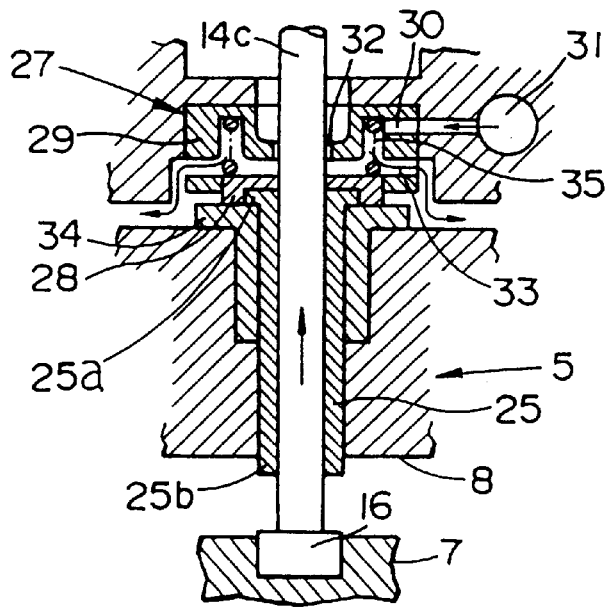
FIGS. 2(a), 2(b), and 2(c) are fragmentary cross-sectional views showing the manner in which certain parts of the solenoid-operated valve shown in FIG. 1 operate.

A first damping means 27 is disposed between the first solenoid 5 and the second spring 24. As shown in FIGS. 1 and 2(a), the first damping means 27 comprises a piston 28 fixed to a proximal end 25a of the first movable sleeve 25 slidably inserted in the first solenoid 5, and a cylinder 29 in which the piston 28 is axially slidably fitted and which is filled with oil. The cylinder 29 has an oil supply port 30 for supplying oil into the cylinder 29, the oil supply port 30 being connected to an oil passage 31 connected to an oil pump or the like (not shown). The cylinder 29 also has a first oil discharge port 32 for discharging oil supplied from the oil passage 31 via the oil supply port 30, along a peripheral wall of the third valve stem segment 14c, and a second oil discharge port 33 for discharging oil supplied from the oil passage 31 via the oil supply port 30, through a peripheral wall of the cylinder 29. The second oil discharge port 33 is defined through the peripheral wall of the cylinder 29 within an axial range of movement of the piston 28, so that the second oil discharge port 33 can be closed by axial movement of the piston 28. The oil supplied from the oil supply port 30 comprises the lubricant for the internal combustion engine. The oil discharged from the first oil discharge port 32 and the second oil discharge port 33 flows into the solenoid-operated valve 1, and is distributed as the lubricant.

The proximal end 25a of the first movable sleeve 25 is shaped as a flange. When the proximal end 25a abuts against a guide member 34 fixed to the first solenoid 5, a distal end 25b of the first movable sleeve 25 remote from the piston 28 projects from the tip end of the inner yoke 8 of the first solenoid 5 by a distance corresponding to the distance that the piston 28 moves. Although described in detail later on, when the movable plate 7 is attracted by the first solenoid 5 so as to be positioned closely thereto, the distal end 25b of the first movable sleeve 25 abuts against the increased-diameter portion 16 of the third valve stem segment 14c coupled to the movable plate 7. Subsequently, the piston 28 moves in unison with the third valve stem segment 14c (and the movable plate 7).

The cylinder 29 houses therein a spring 35 for normally urging the piston 28 to move the distal end 25b of the first movable sleeve 25 in a direction to abut against the guide member 34 of the first solenoid 5. The spring 35 serves to return the piston 28 to its original position in unison with the third valve stem segment 14c (and the movable plate 7), and exerts a relatively small spring force which will not inhibit movement of the piston 28.

A second damping means 36 is disposed between the second solenoid 6 and the first spring 20. The second damping means 36 is essentially identical in structure to the first damping means 27 described above. Therefore, the parts of the second damping means 36 which are identical to those of the first damping means 27 are denoted by identical reference characters, and will not be described in detail below.

The supply of electric energy to the first and second solenoids 5, 6 is controlled by the solenoid control means. The solenoid control means alternately supplies electric energy to the first and second solenoids 5, 6 to cause the valve body 3 to open and close the intake passage 2. The solenoid control means has a detecting means (not shown) for detecting the positions of the pistons 28, and varies the electric energy supplied to the first and second solenoids 5, 6 depending on the detected positions of the pistons 28. Specifically, as described in greater detail later on, the solenoid control means gradually reduces the electric energy supplied to the first solenoid 5 as the piston 28 of the first damping means 27 moves, and gradually reduces the electric energy supplied to the second solenoid 6 as the piston 28 of the second damping means 36 moves.

Operation of the solenoid-operated valve 1 of the above construction will be described below. In FIG. 1, the movable plate 7 is attracted to the second solenoid 6 to cause the valve body 3 to open the intake passage 2. When the solenoid control means de-energizes the second solenoid 6 and simultaneously energizes the first solenoid 5, the movable plate 7 moves upwardly under magnetic attractive forces from the first solenoid 5, displacing the valve body 3 in a direction, i.e., upwardly in FIG. 1, to close the intake passage 2.

When the movable plate 7 is still spaced from the first solenoid 5, as shown in FIG. 2(a), oil supplied via the oil supply port 30 is filled in the cylinder 29 of the first damping means 27, and any excessive oil (overflowing oil) flows via the first oil discharge port 32 and the second oil discharge port 33 into the solenoid-operated valve 1. The oil flows from the oil supply port 30 under constant pressure, and does not flows back into the oil supply port 30.

Figure 2B:
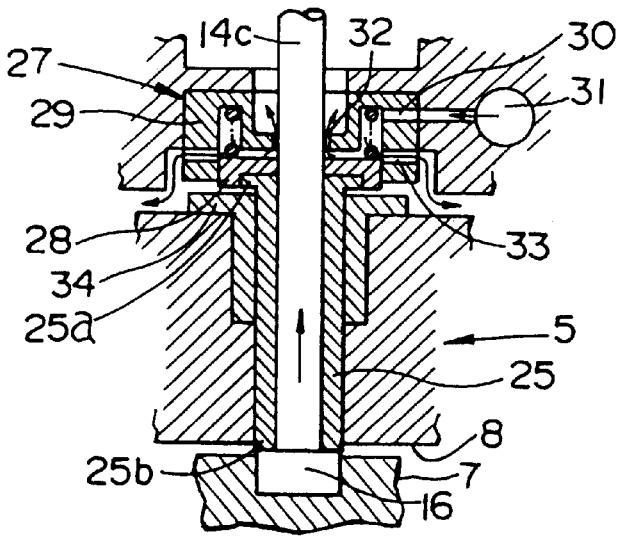

When the movable plate 7 is positioned closely to the first solenoid 5, the increased-diameter portion 16 of the third valve stem segment 14c abuts against the distal end 25b of the first movable sleeve 25. In unison with the movement of the third valve stem segment 14c (and the movable plate 7), the increased-diameter portion 16 pushes the first movable sleeve 25 and hence the piston 28 upwardly, as shown in FIG. 2(b). The upward movement of the piston 28 gradually closes the second oil discharge port 33 in the cylinder 29. Therefore, the resistance to the discharging flow of oil from the cylinder 29 gradually increases, lowering the speed at which the movable plate 7 moves.

The solenoid control means (not shown) reduces the electric energy supplied to the first solenoid 5 based on the movement of the piston 28 which is detected by the detecting means (not shown), as described above. Consequently, the reduction in the speed of the movable plate 7 due to the increase in the resistance to the discharging flow of oil from the cylinder 29 is prevented from being impaired by unduly large attractive forces which would otherwise be applied to the movable plate 7 by the first solenoid 5. The reduction in the electric energy supplied to the first solenoid 5 results in a reduction in the consumption of electric energy by the first solenoid 5.

Figure 2C:
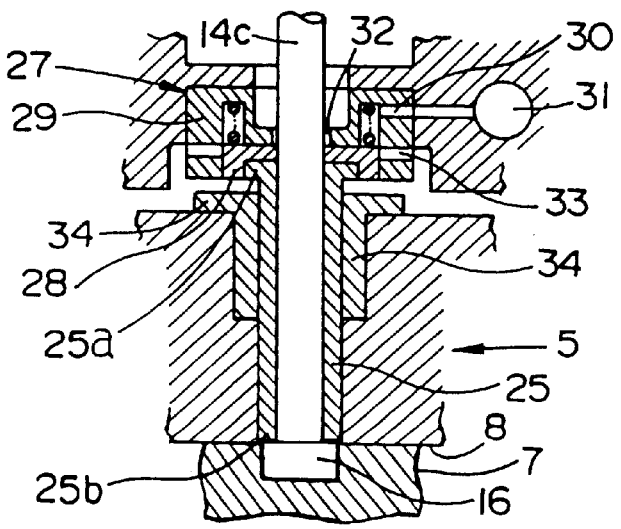

When the piston 28 is positioned in its stroke end as show in FIG. 2(c), the movable plate 7 is attracted to the first solenoid 5. At this time, since the movable plate 7 has sufficiently been decelerated owing to the increased resistance to the discharging flow of oil from the cylinder 29, any shocks caused upon attraction of the movable plate 7 to the first solenoid 5 are small. When movable plate 7 is attracted to the first solenoid 5, the valve body 3 abuts the open end of the intake passage 2 thereby closing the intake passage 3. Because the valve body 3 has also sufficiently been decelerated as it moves in unison with the movable plate 7 through the transmission valve stem 14, any shocks caused upon abutment of the valve body 3 against the open end of the intake passage 2 are small.

Thereafter, the solenoid control means de-energizes the first solenoid 5 and simultaneously energizes the second solenoid 6. The movable plate 7 is spaced from the first solenoid 5, and moves downwardly under magnetic attractive forces from the second solenoid 6. At this time, as shown in FIG. 2(a), the first movable sleeve 25 which has been released from abutment against the increased-diameter portion 16 of the third valve stem segment 14c returns to its original position under the pressure of the oil supplied to the cylinder 29 and the bias of the spring 35 in the cylinder 29.

In FIG. 1, when the movable plate 7 is moved downwardly under magnetic attractive forces from the second solenoid 6, the movable plate 7 is decelerated by the second damping means 36 which is structurally identical to the first damping means 27 in the same manner as it is decelerated by the first damping means 27. Thus, shocks produced when the movable plate 7 is attracted to the second solenoid 6 are small. At this time, the solenoid control means reduces the electric energy supplied to the second solenoid 6 based on the movement of the piston 28 which is detected by the detecting means, as described above. Consequently, the consumption of electric energy by the second solenoid 6 is reduced, and the movable plate 7 is sufficiently decelerated. Furthermore, noise and vibrations produced by the movable plate 7 when the valve body 3 opens the intake passage 2 are reduced.

Although a certain preferred embodiment of the present invention has been shown and described in detail, it should be understood that various changes and modifications may be made therein without departing from the scope of the appended claims.

What is claimed is:

1. A solenoid-operated valve for use in an internal combustion engine, comprising:
   a valve body movable into and out of abutment of an intake/exhaust port in the internal combustion engine to close and open an intake/exhaust passage in communication therewith;
   a moveable plate connected to said valve body by a transmission valve stem;

a first solenoid for magnetically attracting said movable plate to cause said valve body to close said intake/exhaust port;

a second solenoid disposed in confronting relation to said first solenoid with said movable plate interposed therebetween, for magnetically attracting said movable plate to cause said valve body to open said intake/exhaust port;

a piston movable in unison with said transmission valve stem until said valve body closes said intake/exhaust port when said first solenoid magnetically attracts said movable plate to position said valve body closely to said intake/exhaust port; and a cylinder for gradually discharging a fluid filled therein in response to movement of said piston, for thereby causing said transmission valve stem to reduce a speed at which said valve body closes said intake/exhaust port, wherein said transmission valve stem extends from said valve body slidably through said second solenoid and said first solenoid and has an increased-diameter portion disposed between said first solenoid and said movable plate said piston being connected to a moveable member which is movable along said transmission valve stem, said movable member being capable of abutting against said increased-diameter portion to cause said piston to move in unison with said transmission valve stem when said valve body is positioned closely to said intake/exhaust port.

2. A solenoid-operated valve according to claim 1, wherein said cylinder has a fluid supply port for supplying the fluid into said cylinder therethrough and a fluid discharge port for discharging the fluid from said cylinder therethrough, said fluid discharge port being positioned so as to be gradually closable by said piston when said piston moves to discharge the fluid through said fluid discharge port.

3. A solenoid-operated valve according to claim 1, wherein said cylinder is supplied with, as said fluid, a lubricant for the internal combustion engine via said fluid supply port.

4. A solenoid-operated valve according to any one of claims 1, 2, and 3, further comprising solenoid control means for reducing electric energy supplied to said first solenoid in response to movement of said piston.

5. A solenoid-operated valve according to claim 1, further comprising:

another piston movable in unison with said transmission valve stem until said movable body is attracted to said second solenoid when said second solenoid magnetically attracts said movable plate to position said movable body closely to said second solenoid; and another cylinder for gradually discharging a fluid filled therein in response to movement of said other piston, for thereby causing said transmission valve stem to reduce a speed at which said movable plate is displaced.

6. A solenoid-operated valve according to claim 5, wherein said transmission valve stem extends slidably through said second solenoid and has an increased-diameter portion disposed between said second solenoid and said movable plate, said other piston being connected to a movable member which is movable along said transmission valve stem, said movable member being capable of abutting against said increased-diameter portion to cause said other piston to move in unison with said transmission valve stem when said movable plate is positioned closely to said second solenoid.

7. A solenoid-operated valve according to claim 5, wherein said other cylinder has a fluid supply port for supplying the fluid into said other cylinder therethrough and a fluid discharge port for discharging the fluid from said other cylinder therethrough, said fluid discharge port being positioned so as to be gradually closable by said other piston when said other piston moves to discharge the fluid through said fluid discharge port.

8. A solenoid-operated valve according to claim 7, wherein said other cylinder is supplied with, as said fluid, a lubricant for the internal combustion engine via said fluid supply port.

9. A solenoid-operated valve according to any one of claims 5 through 8, further comprising another solenoid control means for reducing electric energy supplied to said second solenoid in response to movement of said other piston.

\* \* \* \* \*